United States Patent
Arunan

(10) Patent No.: US 8,059,683 B2
(45) Date of Patent: Nov. 15, 2011

(54) METHOD FOR TRANSMITTING AND RECEIVING DATA IN NFC

(75) Inventor: Thenmozhi Arunan, Karnataka (IN)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 824 days.

(21) Appl. No.: 12/115,624

(22) Filed: May 6, 2008

(65) Prior Publication Data

US 2008/0280558 A1    Nov. 13, 2008

(30) Foreign Application Priority Data

May 7, 2007   (IN) .............................. 965/CHE/2007
Nov. 8, 2007  (KR) ........................ 10-2007-0113869

(51) Int. Cl.
*H04J 3/16* (2006.01)
*H04J 3/12* (2006.01)

(52) U.S. Cl. ..... 370/471; 455/41.1; 455/41.2; 340/10.1; 340/10.3; 340/10.34; 370/472; 370/473; 370/474; 370/338

(58) Field of Classification Search .................. 455/41.1, 455/41.2; 370/392, 395.5, 470, 471, 472, 370/473, 474, 338; 340/854.6, 854.7, 854.8, 340/10.1, 10.3, 10.34
See application file for complete search history.

(56) References Cited

U.S. PATENT DOCUMENTS

2007/0265033 A1* 11/2007 Brostrom ...................... 455/557
2007/0268897 A1* 11/2007 Nishikawa et al. ........... 370/389
2008/0117919 A1*  5/2008 Kliger et al. .................. 370/400

FOREIGN PATENT DOCUMENTS

| EP | 1533914 | 5/2005 |
| EP | 1845632 A1 | 10/2007 |
| EP | 1845694 A1 | 10/2007 |
| WO | WO 2006/012392 | 2/2006 |
| WO | WO 2006/134704 | 12/2006 |

OTHER PUBLICATIONS

International Standard ISO/IEC; "Information Technology—Telecommunications and Information Exchange Between Systems-Near Field Communication-Interface and Protocol (NFCIP-1);" vol. 18092, 1st Edition; Apr. 1, 2004; XP007905654.

* cited by examiner

*Primary Examiner* — Tuan Pham

(74) *Attorney, Agent, or Firm* — Cha & Reiter, LLC

(57) ABSTRACT

A data transmission/reception method in Near Field Communications (NFC) for enhancing data throughput between at least an initiator device and a target device. The data transmission/reception method typically includes initiating a communication between an initiator and a target that perform NFC, aggregating a plurality of data packet units to be transmitted in order to form an aggregated frame, and transmitting the aggregated frame to a counterpart NFC device.

20 Claims, 4 Drawing Sheets

| DSAP | SSAP | CONTROL FIELD | LEN 1 | LLCP DATA FRAME FOR CONNECTION 1 (NO CRC) | LEN 2 | LLCP DATA FRAME FOR CONNECTION 2 (NO CRC) | LEN 3 | LLCP DATA FRAME FOR CONNECTION 3 (NO CRC) | ... | LEN N | LLCP DATA FRAME FOR CONNECTION N (NO CRC) |

FIG.7

METHOD FOR TRANSMITTING AND RECEIVING DATA IN NFC

CLAIM OF PRIORITY

This application claims the benefit under 35 U.S.C. §119 (a) from a Korean Patent Application filed in the Korean Intellectual Property Office on Nov. 8, 2007 and assigned Serial No. 2007-113869 and an Indian Patent Application field in the Office of the Controller General of Patents, Designs, and Trademarks on May 7, 2007 and assigned Serial No. IN 965/CHE/2007, the entire disclosures of both of which are hereby incorporated by reference in their entirety.

BACKGROUND OF THE INVENTION

1. Field of the Invention

The present invention relates to a data transmission/reception method in Near Field Communications (NFC). More particularly, the present invention relates to a communication method for enhancing data throughput between an initiator and a target that perform NFC.

2. Description of the Related Art

Near Field Communications (NFC) is a method for communication between devices that are spaced from each other within about a 10 cm distance. In NFC protocol stacks, the NFCIP-1 standard is used on physical layers of ISO 14443. In NFCIP-1, devices used for the NFC (or NFCIP-1 devices) may operate either in Active mode or Passive mode. An NFCIP-1 device in a transmission mode is referred to as an initiator and an NFCIP-1 device in a reception mode is referred to as a target.

In Passive mode, an NFCIP-1 device does not have its own power source required for modulation of its own Radio Frequency (RF) field and thus cannot generate a request message by itself. Therefore, a communication must be started by an initiator at all times. In other words, once the initiator (in Active mode) sends a request message through the RF field, the target (in Passive mode) drives a receiver circuit with the power source provided through the RF field. If the initiator does not have any transmission data, the initiator will periodically transmit a symmetry (SYMM) frame.

In response to the SYMM frame or an Information (I) frame received from the initiator, the target responds to the initiator by sending back the received frame to the initiator, with the frame sent back having its own data additionally inserted therein. Thus, the throughput, i.e., data transfer rate, of data transmitted from the target depends on the frequency of the I frame or the SYMM frame received from the initiator.

Moreover, with regard to NFC in the current Logical Link Control Protocol (LLCP) version, the initiator has to wait for reception of a response frame after transmitting a request frame. This waiting is referred to as response waiting time. Due to such a wait, data transfer may be delayed by the amount of response waiting time (RWT). Furthermore, there are several additional overheads to every request frame transmitted by the initiator. As a result, as the amount of data to be transmitted between NFC devices increases, i.e., as the number of request frames transmitted by the initiator increases, the number of RWTs for each request frame increases, and the same overhead is separately transmitted through a plurality of request frames. The aforementioned results in an increase in the amount of data and in turn causes a degradation in the data transfer rate between the NFC devices.

To solve those problems, there is a need for a fundamental method for improving a data transfer rate between NFC devices.

SUMMARY OF THE INVENTION

The present invention is to addresses at least some of the above-mentioned problems and/or disadvantages and provides at least the advantages described below. The present invention provides a method for transmitting aggregated transmission data between Near Field Communications (NFC) devices for enhancing data input.

According to one aspect of the present invention, a data transmission/reception method in Near Field Communications (NFC) includes initiating a communication between an initiator and a target that perform NFC, aggregating a plurality of data packet units to be transmitted in order to form an aggregated frame, and transmitting the aggregated frame to a counterpart NFC device.

The initiation of the communication may include the transmitting and receiving of configuration parameters regarding aggregation of the data packet units.

The initiation of the communication may include, for example, the setting a maximum value for the number of data packet units that can be aggregated.

The aggregated frame may include an identifier of a frame type for indicating whether a data frame included in the aggregated frame is one of an Aggregated Information (AI) frame, or an Aggregated Unnumbered Information (AUI) frame.

The aggregated frame may include, for example, a Cyclic Redundancy Check (CRC) field having a CRC calculated for all the data packet units included in the aggregated frame.

The aggregated frame may include, for example, an aggregated header including overheads of the data packet units included in the aggregated frame.

The aggregation of the data packet units and the transmission of the aggregated frame may be performed, for example, by the initiator that initiates NFC.

The aggregation of the data packet units may include, for example, aggregating data packet units to be transmitted from the same connection.

The aggregation of the data packet units may include, for example, aggregating data packet units to be transmitted from different connections.

The aggregation of the data packet units and the transmission of the aggregated frame may be performed, for example, by the target that operates by using a Radio Frequency (RF) field generated by the initiator as a power source.

The aggregation of the data packet units may include, for example, aggregating data packet units to be transmitted from the same connection or different connections.

The data transmission/reception method may further include, for example, receiving an Information (I) frame from the initiator prior to the aggregation of the data packet units, in which the aggregated frame may be transmitted as a response frame responding to the I frame received from the initiator.

Each of the AI frame and the AUI frame may include, for example, a Destination Service Access Point (DSAP) field, a Source Service Access Point (SSAP) field, a control field, and a data information field.

The data information field of the AI frame may include, for example, a transmission sequence number of a first inserted data packet unit.

The data information field of the AI frame may further include, for example, a value indicating a response sequence number corresponding to a transmission sequence number of a last inserted data packet unit.

Each of the AI frame and the AUI frame from the same logical connection may include, for example, plural aggregated data packet units and include a length information field indicating a length of each data packet unit in front of each data packet unit.

Each of the AI frame and the AUI frame from different logical connections may include, for example, a Logical Link Control Protocol (LLCP) data frame from a corresponding logical connection and include a length information field indicating a length of each LLCP data frame in front of each LLCP data frame.

BRIEF DESCRIPTION OF THE DRAWINGS

The above and other features and advantages of exemplary embodiments of the present invention will be more apparent from the following detailed description taken in conjunction with the accompanying drawings, in which:

FIG. 7 illustrates the structure of data payloads including Logical Link Control Protocol (LLCP) data frames aggregated into data information fields according to another exemplary embodiment of the present invention.

Throughout the drawings, the same drawing reference numerals will be understood to refer to the same elements, features and structures.

DETAILED DESCRIPTION

The matters defined in the description such as a detailed construction and elements are provided to assist a person of ordinary skill in the art with a comprehensive understanding of exemplary embodiments of the invention. Accordingly, those of ordinary skill in the art will recognize that various changes and modifications of the exemplary embodiments described herein can be made without departing from the scope and spirit of the invention. Known structures and configurations may be omitted when their inclusion may obscure appreciation by a person of ordinary skill in the art of the subject matter of the present invention.

Figure 1:
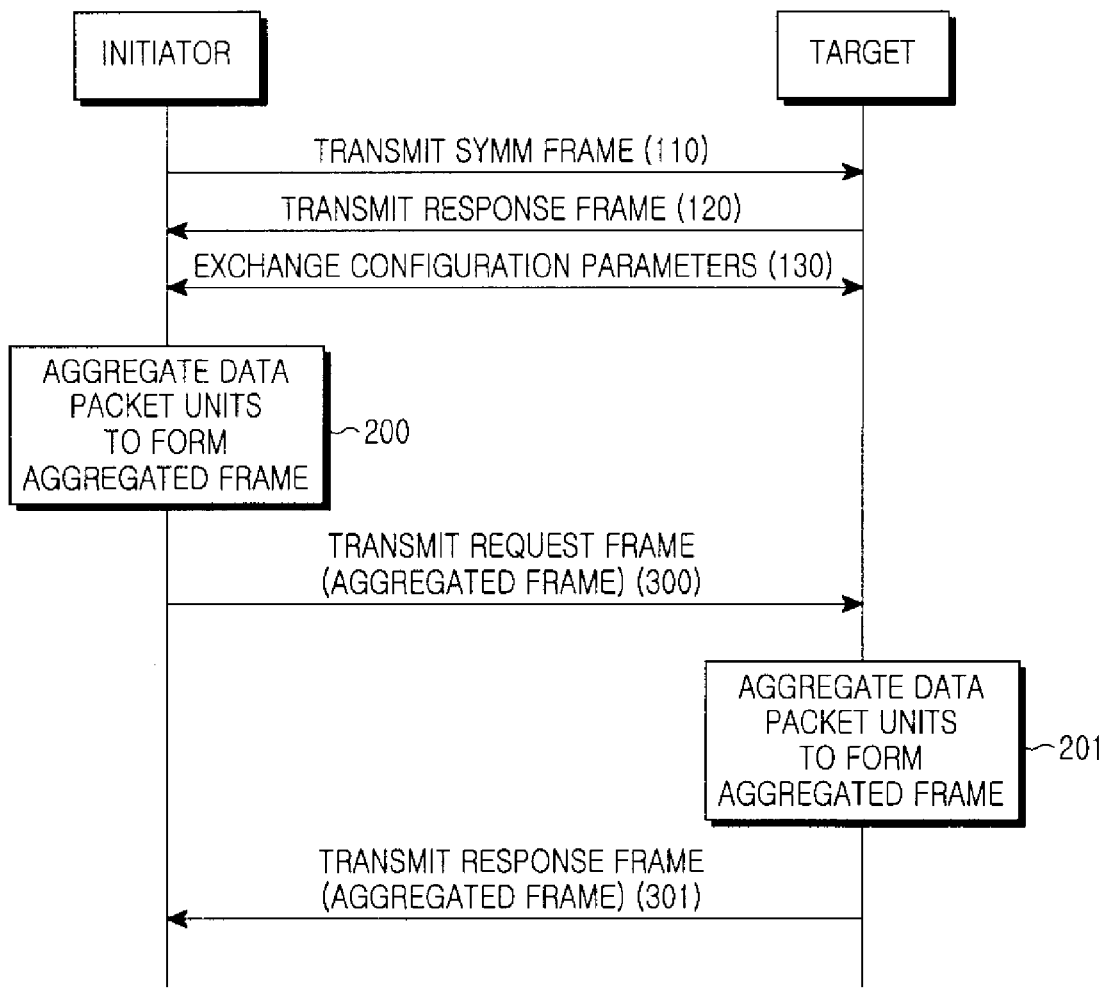
FIG. 1 is a ladder diagram illustrating a data transmission/reception method according to an embodiment of the present invention.

FIG. 1 is a flowchart illustrating an example of data transmission/reception method according to the present invention.

Referring now to FIG. 1, the data transmission/reception method according to this exemplary embodiment of the present invention includes step 100 (not shown) of initiating communication between devices supporting Near Field Communications (NFC), which will hereinafter be referred to as NFC devices.

NFC may be typically performed by data transmission/reception between an initiator and a target. The initiator periodically generates and outputs a Radio Frequency (RF) field including a symmetry (SYMM) frame in step 110. Once the target moves into a region of the RF field, it operates by using an RF signal received from the initiator as a power source to enable the target to respond to the initiator. In step 120, the target load-modulates the RF signal, thereby sending back a response frame that responds to the SYMM frame transmitted in step 110. In this way, a link between the initiator and the target is set up.

Upon setup of the link between the initiator and the target, the initiator and the target can then exchange configuration parameters required for communication through the link in step 130. The configuration parameters may include information about whether the initiator and the target support aggregation of data packet units. The configuration parameters may also include the maximum number of data packet units that can be aggregated.

Figure 2:
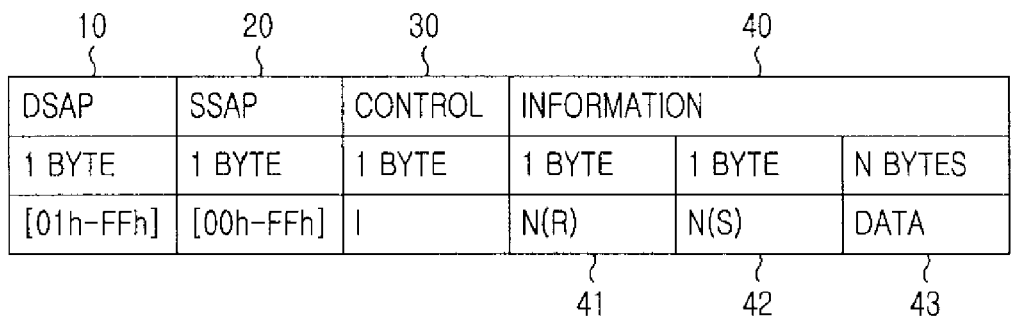
FIG. 2 illustrates the structure of an Aggregated Information (UI) frame generated according to an exemplary embodiment of the present invention.

Still referring to FIG. 1, the data transmission/reception method includes a step of aggregating a plurality of data packet units to be transmitted. As shown in FIG. 2, this step may be one of step 200 for aggregating data packet units to be transmitted from the initiator to the target to form an aggregated frame or step 201 for aggregating data packet units requested to the target by the initiator to form an aggregated frame.

A description will now be made herein below regarding the structure of a data frame generated by the step of aggregating data packet units in order to describe in detail, step 200 and step 201 according to an exemplary embodiment of the present invention.

According to the LLCP specification of NFC, two types of data transmission are used, which are referred to a first transmission type and a second transmission type.

The first transmission type of data transmission comprises a connection-less transmission type that is generally considered less reliable than the second transmission type. An information frame called an Unnumbered Information (UI) frame is used in the first transmission type.

The second transmission type of data-transmission is a connection-oriented and more reliable transmission type that implements flow control. An information frame called an Information (I) frame is used in the second transmission type.

Figures 3, 4, 5:
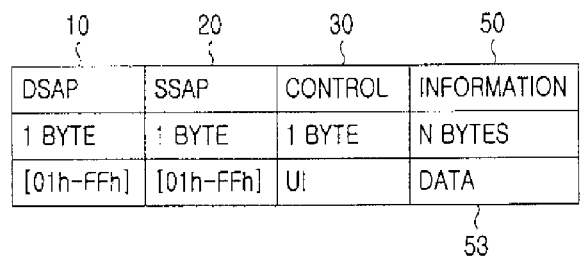
FIG. 3 illustrates the structure of an Aggregated Unnumbered Information (AUI) frame generated according to an exemplary embodiment of the present invention.
FIG. 4 illustrates the structure of a control field according to an exemplary embodiment of the present invention.
FIG. 5 illustrates the structure of data payloads including data packet units aggregated into data information fields according to an exemplary embodiment of the present invention.

FIG. 2 illustrates the structure of an Aggregated Information (UI) frame generated according to an exemplary embodiment of the present invention, and FIG. 3 illustrates the structure of an Aggregated Unnumbered Information (AUI) frame generated according to another exemplary embodiment of the present invention. Referring to the examples shown in FIGS. 2 and 3, each of the AI frame and the AUI frame of the present invention typically includes a Destination Service Access Point (DSAP) field 10 including an address of a destination, a Source Service Access Point (SSAP) field 20 including an address of a source, a control field 30, and one of a data information field 40 for the AI frame, or a data information field 50 for the AUI frame.

Still referring to FIGS. 2 and 3, each of the DSAP field 10, the SSAP field 20, and the control field 30 has the same size and structure for both the AI frame and the AUI frame. On the other hand, the data information field 40 and the data information field 50 are set differently for the AI frame and the AUI frame.

The data information field 40 of the AI frame illustrated in FIG. 2 typically includes a field 43 for recording plural aggregated data packet units and a field 42 for recording a sequence number of a data packet unit (or a first data packet unit) that is to be first transmitted from among data packet units to be transmitted. The data information field 40 of the AI frame may further include a field 41 for recording a response sequence number that is set to correspond to the sequence number of a last data packet unit.

The response sequence number in field 40 may be set to correspond to a data packet unit (or the last data packet unit) included last among data packet units included in a payload of the data information field 40. The response sequence number may comprise a value increased by one from the sequence number of the previous data packet unit.

For example, it is assumed that the data information field 40 of the AI frame includes 3 aggregated data packet units and the field 42 for recording the sequence number of the first data packet unit is set to 4. The 3 data packet units included in the data information field 40 are sequentially assigned sequence numbers based on the sequence number of the first data packet unit. Thus, in the data information field 40, the sequence number of the last data packet unit may be 6. In the field 41, the response sequence number may be set to 7 that is a value increased by one from the sequence number, i.e., 6, of the last data packet unit. In this way, the present invention makes it is possible to implement accumulative acknowledgement for all data frames in the AI frame and also to efficiently maintain flow control.

The data information field 50 of the AUI frame illustrated in FIG. 4 includes plural aggregated data packet units instead of fields for recording sequence numbers as in FIG. 2.

FIG. 4 illustrates the structure of the control field 30 according to an embodiment of the present invention. Referring to FIG. 4, the control field 30 included in both the AI frame and the AUI frame has a size of 1 byte, in which a command is recorded in $0^{th}$-$3^{rd}$ bits (indicated by reference numeral 32) and information indicating a frame type is recorded in $5^{th}$ and $6^{th}$ bits (indicated by reference numeral 31). The information recorded in the $5^{th}$ and $6^{th}$ bits may be defined in TABLE 1 as follows:

TABLE 1

| Control value | Indicating information |
| --- | --- |
| 00 | Supervisory |
| 01 | AUI frame |
| 10 | AI frame |
| 11 | Other |

In Table 1, '00' indicates a supervisory signal used to indicate several operation states of circuit combinations or apply changes, '01' indicates that a corresponding frame is an AUI frame, and '10' indicates that a corresponding frame is an AI frame. As such, it can be identified whether a corresponding data frame is an AI frame or an AUI frame by using the $5^{th}$ and $6^{th}$ bits of the control field 30.

FIG. 5 illustrates the structure of data payloads 43 and 53 including data packet units aggregated into the data information fields 40 and 50 according to an exemplary embodiment of the present invention. In the example in FIG. 5, aggregation of data packet units from the same logical connection will be taken as an example. The same logical connection means the same DSAP-SSAP connection.

Referring to FIG. 5, a data payload according to an exemplary embodiment of the present invention includes plural data packet units 52 to be transmitted through the same connection and a length information field 51 inserted in front of each of the data packet units. The length information field 51 indicates the number of bytes of each data packet unit. Each data packet unit may include optional padding bytes, and the number of bytes of the data packet unit in length information field 51 may indicate the number of bytes including the padding bytes. A Cyclic Redundancy Check (CRC) is calculated and included for all the data packet units and the length information field included in the data payload.

Referring back to FIG. 1, the data transmission/reception method according to the exemplary embodiment of the present invention also includes one of step 300 or 301 of transmitting an aggregated frame generated in step 200 or 201, respectively to a counterpart device.

If the aggregated frame has been generated by the initiator, the initiator transmits the aggregated frame to the target in step 300. On the other hand, if the aggregated frame has been generated by the target, the target transmits the aggregated frame to the initiator as a response frame responding to a request frame transmitted from the initiator in step 301.

In the data transmission/reception method according to the examples disclosed above, aggregation of transmission data from the same connection for explanatory purposes. However, aggregation of transmission data from different connections is within the spirit of the present invention and the scope of the appended claims. The different connections mean, for example, different DSAP-SSAP connections.

Figure 6:
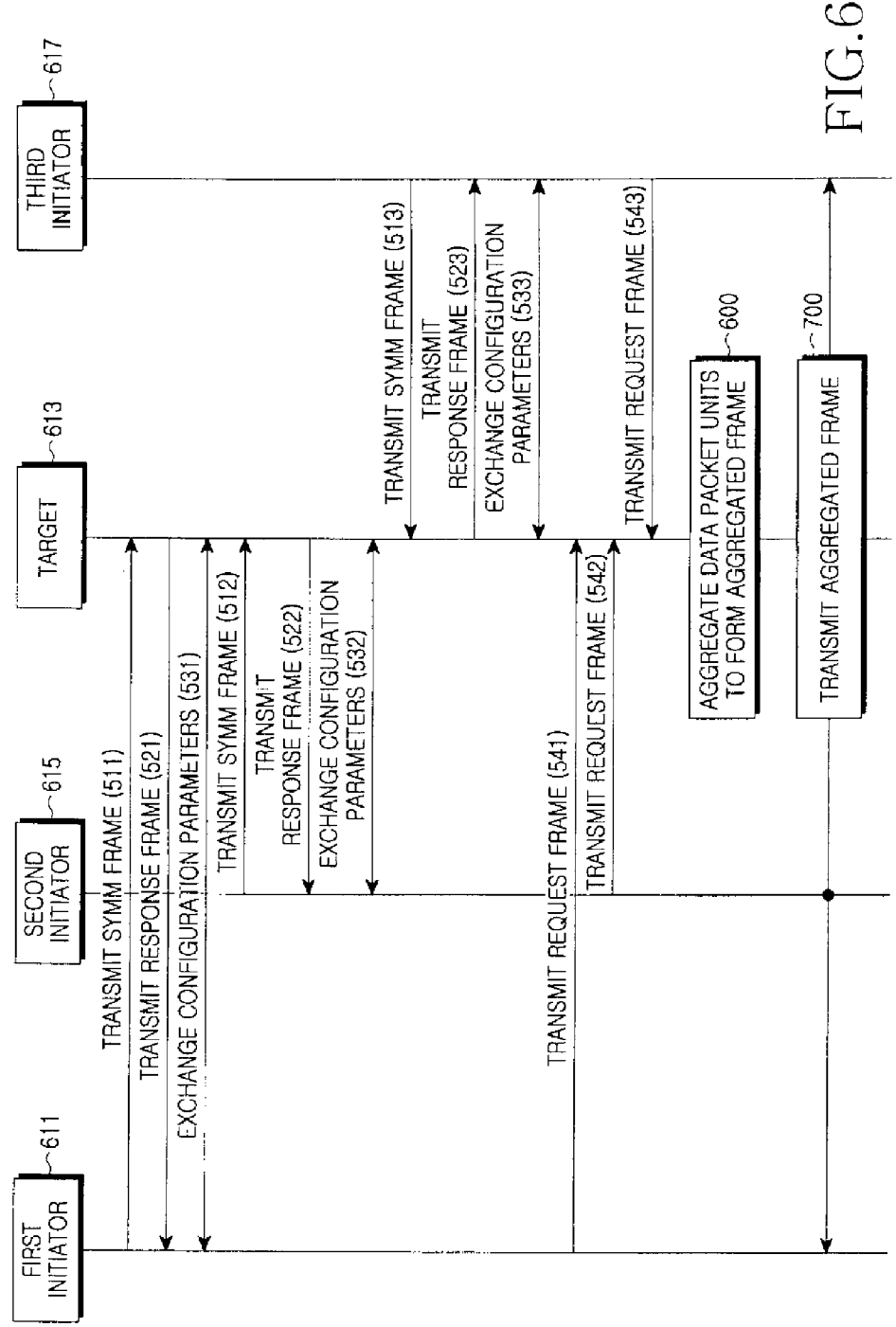
FIG. 6 is a ladder diagram illustrating a data transmission/reception method according to another exemplary embodiment of the present invention.

FIG. 6 is a flowchart illustrating a data transmission/reception method according to another exemplary embodiment of the present invention. Referring to FIG. 6, data transmission/reception between a plurality of initiators and a single target according to this exemplary embodiment of the present invention is provided by way of example.

FIG. 6 shows that each of first through third initiators 611, 615, 617, periodically outputs an SYMM frame in steps 511, 512, and 513, respectively. Once a target moves into a region of an RF field, the target operates by using an RF signal received from the initiator as a power source. The target 613 load-modulates the RF signal, thereby sending back a response frame responding to the SYMM frame in steps 521, 522, and 523. In this way, a link between each of the first through third initiators and the target is set up.

Upon setup of the communication link, each of the first through third initiators 611, 615, 617 and the target 613 exchange configuration parameters required for communication through the link in steps 531, 532, and 533. The configuration parameters may include information about whether each initiator and the target support aggregation of data packet units. The configuration parameters may also include the maximum number of data packet units that can be aggregated.

Each of the first through third initiators 611, 615, 617 transmits a request frame, e.g., an LLCP data frame, to the target 613 in steps 541, 542, and 543. Upon receipt of the request frames, the target, perceiving the request frames received from the first through third initiators, aggregates data frames requested through the request frames to form an aggregated data frame in step 600.

Still referring to FIG. 6, step 600 of aggregating data frames in the data transmission/reception method according to the current exemplary embodiment of the present invention is similar to step 200 in the data transmission/reception method according to the previous exemplary embodiment of the present invention. However, in the data transmission/reception method according to the current exemplary embodiment of the present invention, LLCP data frames to be transmitted from different connections are aggregated for transmission.

In other words, as disclosed in the above paragraph, a header in the data transmission/reception method according to the current exemplary embodiment of the present invention has a similar structure as that in the data transmission/reception method according to the previous exemplary embodiment of the present invention, and a DSAP field and an SSAP field included in the header according to the current exemplary embodiment of the present invention are set to 0. A data payload generated in step 600 has a structure illustrated in FIG. 7.

Referring to FIG. 7, the data payload according to another exemplary embodiment of the present invention includes a plurality of LLCP data frames transmitted from different logical connections. The plurality of LLCP data frames does not include a header field and a CRC field. The data payload includes a length information field inserted in front of each of the LLCP data frames. The length information field (e.g. LEN 1, LEN 2, etc.) that indicates the number of bytes of each LLCP data frame. Each LLCP data frame may include optional padding bytes, and the number of bytes of the LLCP data frame may indicate the number of bytes including the padding bytes. A CRC may be calculated and included for an aggregated LLCP data frame and the length information field, instead of for each LLCP data frame.

The data transmission/reception method according to another exemplary embodiment of the present invention also includes step 700 of transmitting the aggregated data frame. In step 700, the single initiator may transmit the aggregated data frame including a DSAP field and an SSAP field that are set to 0 to each of the plurality of targets as a response frame.

In another exemplary embodiment of the present invention, communications between the plurality of initiators and the single target are taken as an example, and once the target is requested by the plurality of initiators to transmit data, it aggregates the plurality of LLCP data frames to form an aggregated data frame and transmits the aggregated data frame to each of the initiators as a response. However, the present invention is not limited to this exemplary embodiment of the present invention. For example, communications between a plurality of targets and a single initiator may also be possible. In this case, the single initiator may aggregate LLCP data frames to form an aggregated data frame and transmit the aggregated data frame to each of the plurality of targets.

While the invention has been shown and described with reference to exemplary embodiments thereof, it will be understood by those skilled in the art that various changes in form and details may be made therein without departing from the spirit and scope of the invention, as defined in part by the appended claims. For example, the counterpart NFC device may be another device other than the target or the initiator device. In addition, a maximum value for the number of data packets can be set by one of the initiator and the target having the lowest capacity for transceiving or processing data packets.

What is claimed is:

1. A data transmission/reception method in Near Field Communications (NFC), the method comprising:
   (a) initiating a communication between an initiator and a target that perform NFC;
   (b) aggregating a plurality of data packet units for transmission to form an aggregated frame; and
   (c) transmitting the aggregated frame to one of the target and the initiator,
   wherein the aggregated frame comprises an identifier of a frame type indicating whether a data frame included in the aggregated frame comprises an Aggregated Information (AI) frame or an Aggregated Unnumbered Information (AUI) frame,
   wherein the AI frame comprises a data information field that includes a plurality of sequence numbers associated with transmission of the plurality of data packets and reception thereof and the plurality of aggregated data packets, and the AUI frame comprises a data information field that includes the plurality of aggregated data packets without the plurality of sequence numbers associated with transmission of the plurality of data packets and reception thereof.

2. The data transmission/reception method of claim 1, wherein the initiation of a communication comprises transmitting and receiving configuration parameters regarding the aggregation of the data packet units.

3. The data transmission/reception method of claim 1, wherein the initiation of a communication in (a) comprises setting a maximum value for the number of data packet units that can be aggregated.

4. The data transmission/reception method of claim 3, wherein said maximum value for the number of data packets is set by the initiator.

5. The data transmission/reception method of claim 3, wherein said maximum value for the number of data packets is set by the target.

6. The data transmission/reception method of claim 3, wherein said maximum value for the number of data packets is set one of the initiator and the target having the lowest capacity for transceiving data packets.

7. The data transmission/reception method of claim 1, wherein the aggregated frame includes a Cyclic Redundancy Check (CRC) field having a CRC value calculated for all the data packet units included in the aggregated frame.

8. The data transmission/reception method of claim 1, wherein the aggregated frame comprises an aggregated header including overheads of the data packet units included in the aggregated frame.

9. The data transmission/reception method of claim 1, wherein the aggregation of the data packet units and the transmission of the aggregated frame are performed by the initiator that initiates NFC.

10. The data transmission/reception method of claim 9, wherein the aggregation of the data packet units comprises aggregating data packet units for transmission from a same connection.

11. The data transmission/reception method of claim 9, wherein the aggregation of the data packet units comprises aggregating data packet units for transmission from different connections.

12. The data transmission/reception method of claim 1, wherein the aggregation of the data packet units and the transmission of the aggregated frame are performed by the target operating by a Radio Frequency (RF) field generated by the initiator as a power source.

13. The data transmission/reception method of claim 12, wherein the aggregation of the data packet units comprises aggregating data packet units for transmission from the same connection.

14. The data transmission/reception method of claim 12, wherein the aggregation of the data packet units comprises aggregating data packet units for transmission from different connections.

15. The data transmission/reception method of claim 12, further comprising receiving an Information (I) frame from the initiator prior to the aggregation of the data packet units, wherein the aggregated frame is transmitted as a response frame responding to the I frame received from the initiator.

16. The data transmission/reception method of claim 1, wherein each of the AI frame and the AUI frame comprises a Destination Service Access Point (DSAP) field, a Source Service Access Point (SSAP) field, a control field, and a data information field.

17. The data transmission/reception method of claim 16, wherein the data information field of the AI frame comprises a transmission sequence number of a first inserted data packet unit.

18. The data transmission/reception method of claim 17, wherein the data information field of the Al frame further comprises a value indicating a response sequence number corresponding to a transmission sequence number of a last inserted data packet unit.

19. The data transmission/reception method of claim 16, wherein each of the AI frame and the AUI frame from the same logical connection comprises plural aggregated data packet units and comprises a length information field indicating a length of each data packet unit in front of each data packet unit.

20. The data transmission/reception method of claim 16, wherein each of the AI frame and the AUI frame from different logical connections comprises a Logical Link Control Protocol (LLCP) data frame from a corresponding logical connection and comprises a length information field indicating a length of each LLCP data frame in front of each LLCP data frame.

* * * * *